US006525289B2

(12) United States Patent
Ananthanarayanan et al.

(10) Patent No.: US 6,525,289 B2
(45) Date of Patent: Feb. 25, 2003

(54) PISTON FOR MAGNETO-RHEOLOGICAL FLUID SYSTEMS AND METHOD FOR ITS MANUFACTURE

(75) Inventors: Venkatasubramanian Ananthanarayanan, Beavercreek, OH (US); Michael Henry Froning, Bellbrook, OH (US); Sohrab Sadri Lonbani, Xenia, OH (US); Janusz Pawel Goldasz, Kraków (PL); Michael Everett Hornback, Xenia, OH (US); Patrick Neil Hopkins, West Carollton, OH (US); William Charles Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/775,192

(22) Filed: Feb. 1, 2001

(65) Prior Publication Data

US 2002/0100365 A1 Aug. 1, 2002

(51) Int. Cl.[7] .............................. B23K 11/00; F16J 1/00
(52) U.S. Cl. ...................... 219/78.02; 219/148; 92/260; 92/231
(58) Field of Search .......................... 219/50, 148, 149, 219/78.02; 92/260, 231

(56) References Cited

U.S. PATENT DOCUMENTS 4,106,171 A * 8/1978 Basiulis .................. 29/890.032

FOREIGN PATENT DOCUMENTS

DE 3304903 A1 * 8/1984

* cited by examiner

*Primary Examiner*—M. Alexandra Elve
*Assistant Examiner*—Kevin McHenry
(74) *Attorney, Agent, or Firm*—Scott A. McBain (57) ABSTRACT

The piston for a magneto-rheological fluid system is manufactured from a piston skirt of a material having a high magnetic permeability and a piston plate which closes one end of the piston skirt having a low magnetic permeability and therefore must be made out of a material such as stainless steel. The piston is manufactured by placing the plate on one electrode and clamping another set of electrodes against the outer circumferential surface of the piston ring or skirt. The plate and ring are brought into contact with one another while applying a current through the piston ring and the piston plate, thereby heating interfering portions of the ring and plate and permitting the plate to be forced inside of the ring while at the same time allowing the softened or plastic portions of the ring and plate to intermingle with one another and thus form a solid state bond.

13 Claims, 7 Drawing Sheets

PISTON FOR MAGNETO-RHEOLOGICAL FLUID SYSTEMS AND METHOD FOR ITS MANUFACTURE

TECHNICAL FIELD

This invention relates to a piston and a method of manufacturing a piston for use in magneto-rheological fluid systems.

BACKGROUND OF THE INVENTION

Suspension dampers, such as shock absorbers, have been used for many years to control the ride quality of automotive vehicles. In many vehicles, it is desirable to control suspension stiffness. Recently, magneto-rheological fluids have become available for use in vehicle suspension dampers. Magneto-rheological fluids permit the viscosity of the damping fluid to be changed in response to an applied magnetic field. Ride stiffness may thereby be controlled by controlling current in an electric coil within the damper. In magneto-rheological suspension systems, a magnetic field is generated and is applied to the magneto-rheological damping fluid, thereby permitting the viscosity of the fluid to be modified depending upon ride conditions. Accordingly, the stiffness of the suspension system may be easily controlled.

Magneto-rheological suspension systems require a piston rod and a suspension piston in which a coil is mounted. The coil circumscribes the piston rod, and the fluid is communicated through passages circumscribing the piston rod between the coil and the piston ring or skirt. The piston includes a piston skirt or ring, which is held in place by a piston plate which is mounted on the piston rod and supports the piston ring. Accordingly, in order that the magnetic field be applied to the magneto-rheological fluid communicated through the passages, the portion of the piston rod extending through the coil and the piston skirt or ring must be made of a magnetically soft material exhibiting high magnetic permeability and high saturation magnetization. The piston plate, which extends between the piston ring and the piston rod, is desirably a magnetic insulator exhibiting low magnetic permeability and serves only to hold the other components in place. Accordingly, the rod and piston ring define a magnetic circuit in which the electrodes are the piston rod and piston ring. This magnetic circuit is energized by the coil and the magnetic field is generated by electrical current flowing through the coil.

Since the piston ring must be made of a material having high magnetic permeability and the piston plate is desirably a magnetic insulator having extremely low magnetic permeability, it is desirable to manufacture the piston ring and rod out of low carbon soft magnetic steel, while the plate is desirably made out of non-magnetic stainless steel. Because the plate and piston ring are made out of materials having different properties, joining the plate to the ring has been difficult. Conventional welding and brazing techniques have proven to be unreliable. Welding dissimilar materials of the type used in the piston ring and plate disclosed herein is inherently difficult and often results in inconsistent and cracked or failed welds.

SUMMARY OF THE INVENTION

According to the invention, the ring is clamped in two nearly semi-circular electrodes whose inner diameter matches the outer diameter of the ring closely. The semi-circular electrodes are connected together electrically and connected to one of the terminals of a power supply of a resistance welding machine. The plate is supported on a deflectable pin that extends coaxially through the ring so that the plate is supported coaxial with the ring. The plate is engaged by another electrode which is connected to the other terminal of the power supply of the resistance welding machine. The ring is urged against the ring with a predetermined weld force. Electrical current is then caused to flow through the ring and the plate. The magnitude of the current is adjusted so that the portions of the ring and the plate which engage one another are heated to a temperature causing the portions in both components engaging one another to become pliable or plastic. When this occurs, the plate is forced into the piston, thereby causing the plasticized material at the interface to mix with one another, thereby forming a solid state bond between the components. Because of the intermingling of the portions of the components, the strength of the bond is greater than the strength of either of the components. Although the invention has been specifically described with respect to a magneto-rheological suspension damper, the piston of the present invention may be used in other types of magneto-rheological fluid systems.

DESCRIPTION OF THE PREFERRED EMBODIMENT

Figure 1:
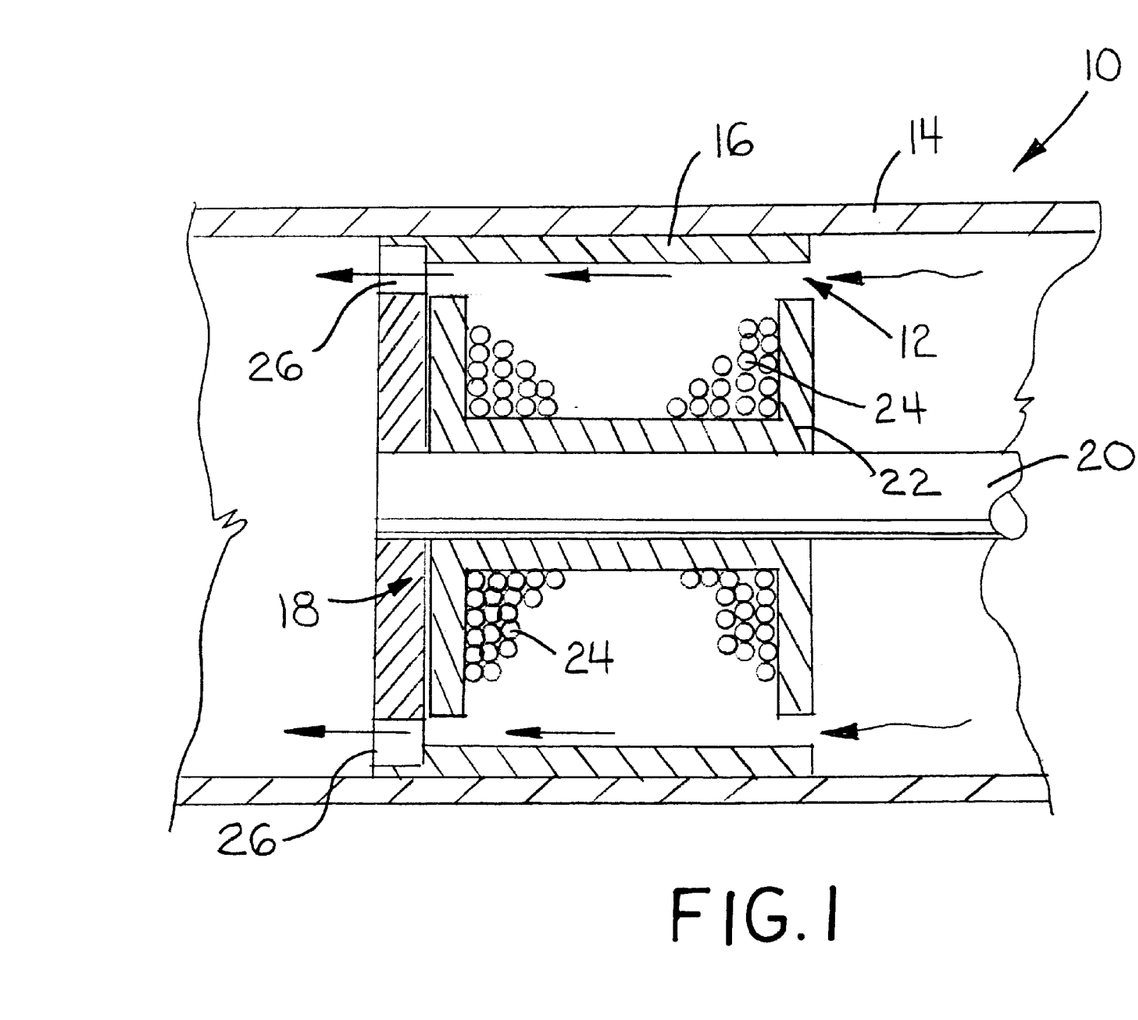
FIG. 1 is a cross sectional view of a piston assembly using a piston made according to the present invention.

Referring now to the drawings, a suspension damper generally indicated by the numeral 10 is designed to operate with a magneto-rheological damping fluid to control suspension stiffness. Magneto-rheological fluids are commercially available and generally comprise a synthetic hydrocarbon or silicone based fluid in which magnetically soft particles (such as iron microspheres) are suspended. In the absence of a magnetic field, the particles exhibit a random orientation within the fluid. Fluid viscosity is relatively low. When a magnetic coil generates a magnetic field in the vicinity of the fluid, the applied magnetic field aligns the magnetic particles into fibrous structures, thereby changing the fluid viscosity to a much higher value. By controlling current in the electromagnetic coil, the strength of the applied magnetic field may be varied, thus permitting gradations in the viscosity of the fluid. Referring to the damper 10 of FIG. 1, a piston generally indicated by the numeral 12 is slidably received within a conventional damping tube 14. The piston 12 includes a piston ring or skirt 16 and a piston plate 18 which closes one end of the skirt 16. A piston rod 20 is coaxial with the plate 18 and is secured thereto. Circumscribing the piston rod 20, and secured thereto, is a coil carrier 22, which holds an electrical coil 24. Circumferentially spaced passages 26 extend through the plate 18 and permit communication of damping fluid through the piston 12. Accordingly, the coil 24 energizes a magnetic circuit comprising the piston rod 20 and skirt 16. It is, accordingly, desirable that the piston ring or skirt 16 be held away from the core defined by the piston rod 20 with a fixed annular gap. Accordingly, while it is desirable that the piston skirt 16 and rod 20 and coil carrier 22 be made out of a soft magnetic material having high magnetic permeability and high saturation magnetization, it is desirable that the plate 18 act as a magnetic insulator between the core of the magnetic circuit (piston 20 and coil carrier 22) and the piston skirt 12, which defines a flux ring. Accordingly, it is desirable, in order to minimize the hysterisis loop of the magnetic circuit and minimize energy losses when current is applied to the coil 24, that the plate 18 have a low or minimum permeability (ideally approaching that of a vacuum) and low magnetization. A typical material which permits the plate to act as a magnetic insulator is nonmagnetic stainless steel. However, as discussed above, securing the plate 18 to the skirt for ring 16 has proven to be difficult, as brazing and mechanical attachment (crimping) of the plate to the skirt have been undesirable, and most welding techniques generate hot cracks in the stainless steel and otherwise yield poor weld quality.

Figure 2:
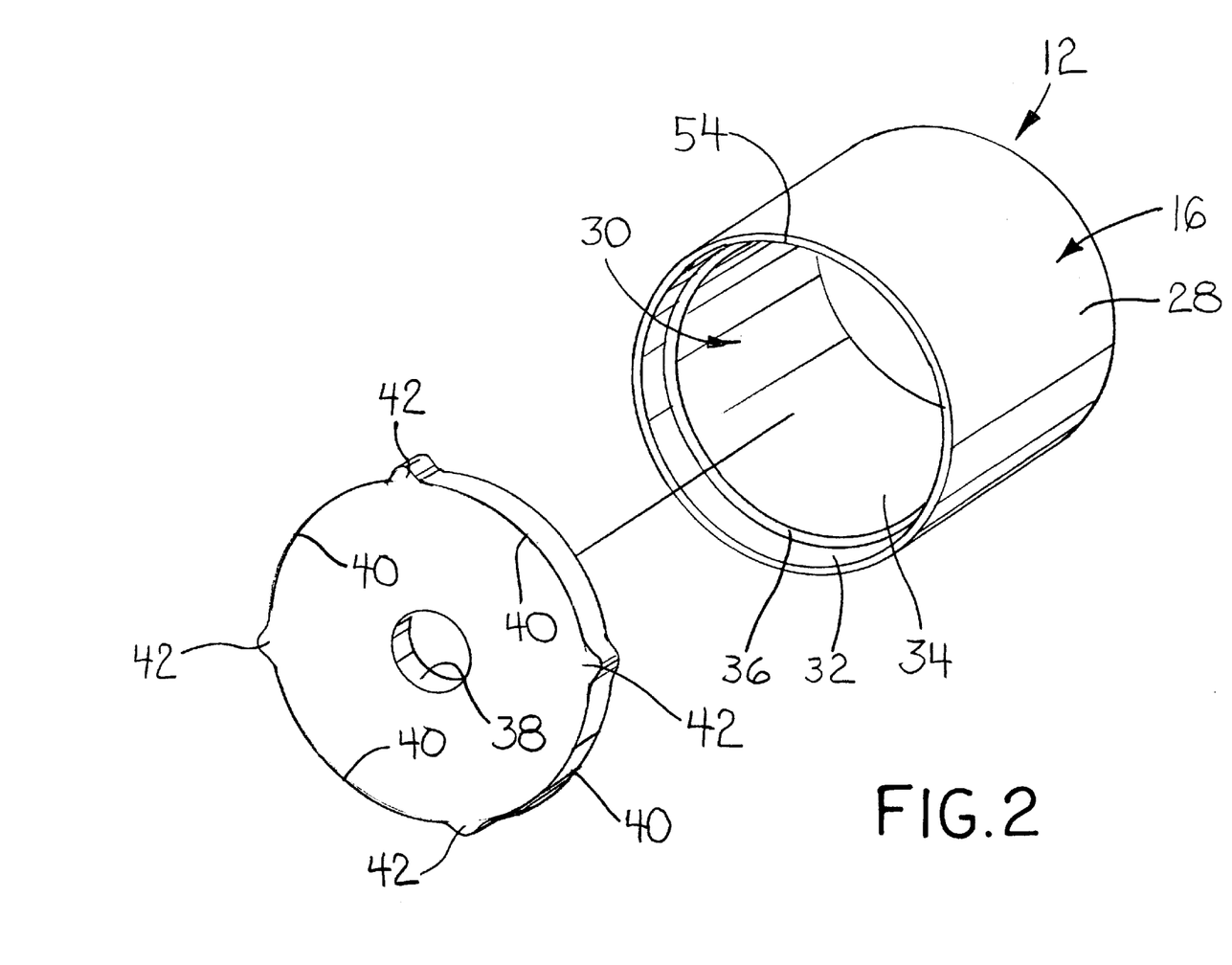
FIG. 2 is an exploded view in perspective of a piston made according to the present invention.
Figure 3:
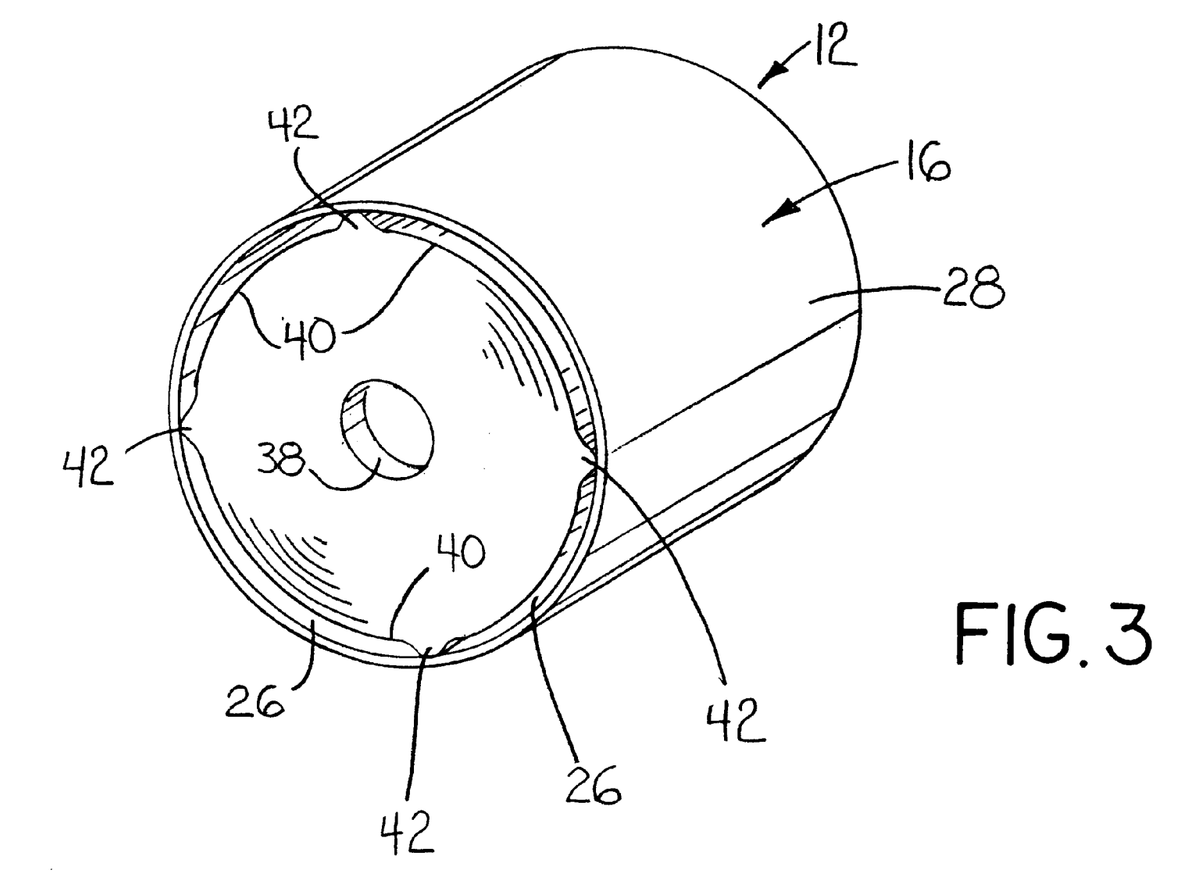
FIG. 3 is an assembled view in perspective of the piston illustrated in FIG. 2.

The skirt or piston ring 16 includes an outer diameter surface 28 and inner diameter surface 30, which is stepped to defined a larger diameter portion 32 and a smaller diameter portion 34 with a shoulder 36 therebetween. Piston plate 18 is provided with a central opening 38 through which piston rod 20 extends and is attached. Plate 18 also defines an outer circumferential surface 40, which is less than the smaller diameter portion 34 of skirt 16 and cooperates with inner circumferential surface 30 to define the passages 26 therebetween. Segments of the outer circumferential surface 40 extend between radially outwardly projecting portions 42 of the plate 18. As can be seen on FIG. 3, the diameter of the plate 18 taken across the tips of the outwardly projecting portions 42 is slightly greater than the larger diameter portion 32 of the piston skirt 16, so that the plate 18 interferes with the larger diameter portion.

Figure 4:
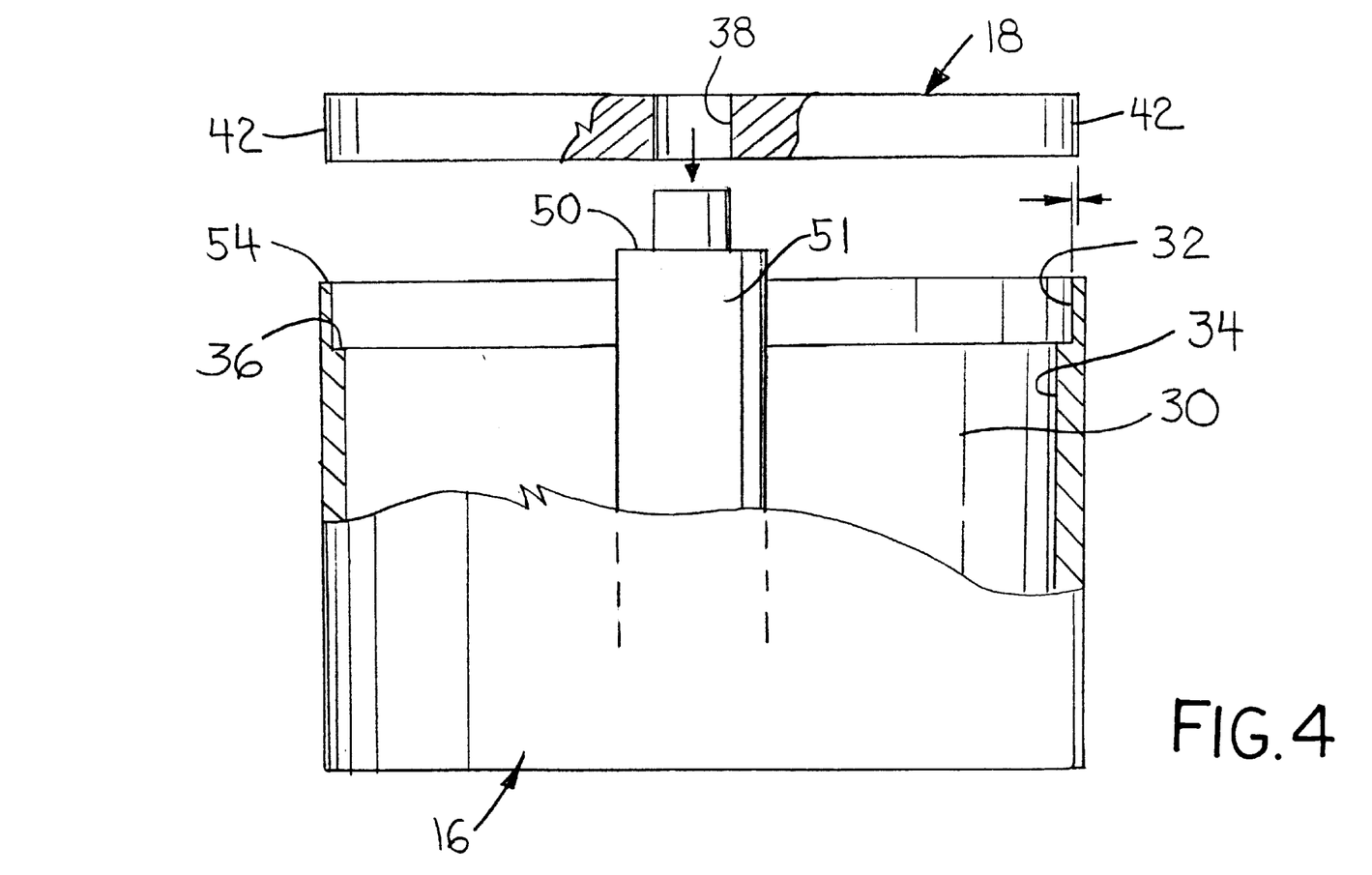
FIG. 4 is a side elevation view, partly in section of the piston skirt and piston plate comprising the piston illustrated in FIGS. 2 and 3 immediately before the piston plate is installed on the piston skirt.
Figure 5:
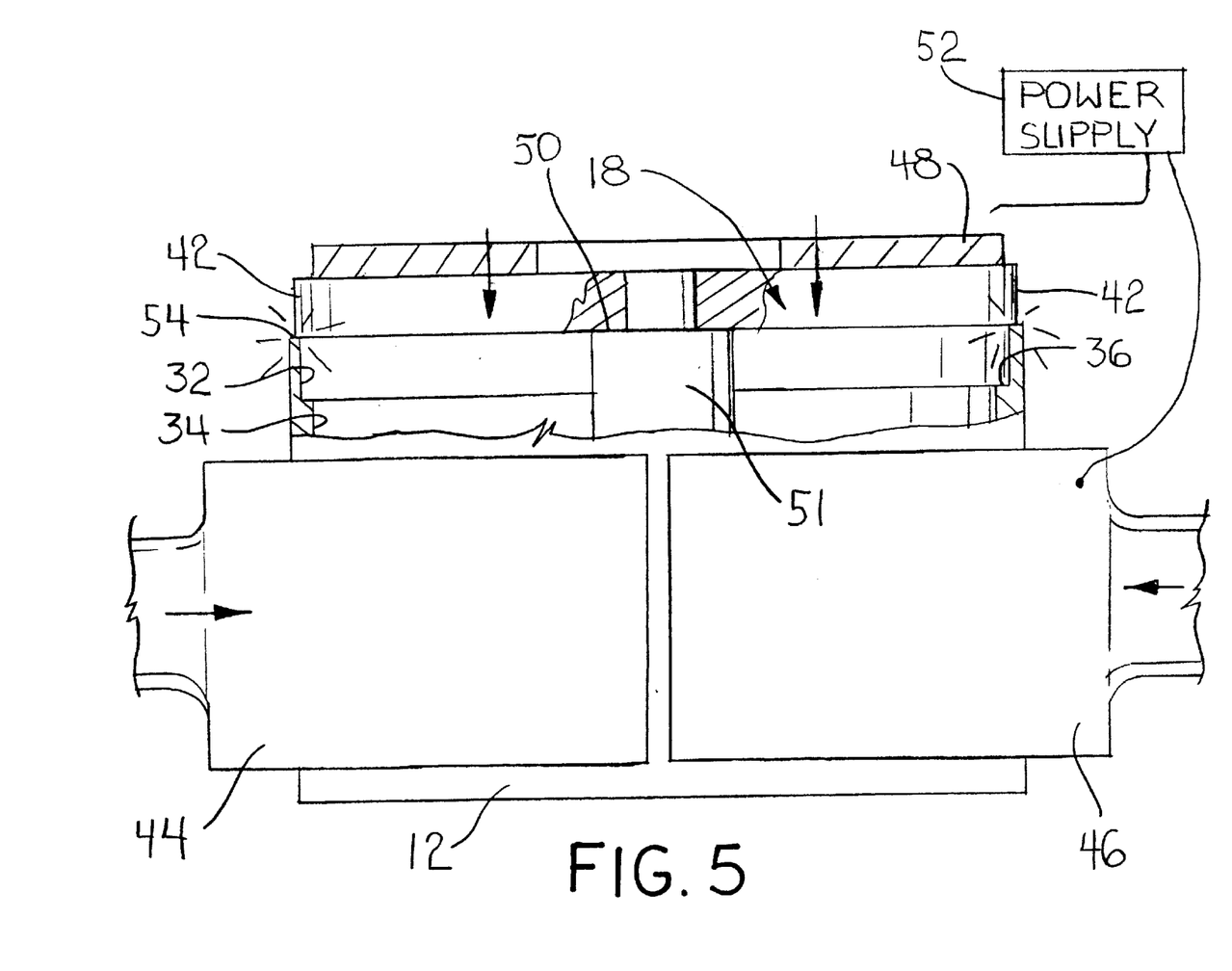
FIGS. 5–7 are views similar to FIG. 4, but illustrating the various steps required to manufacture the piston illustrated in FIGS. 2 and 3.
Figure 6:
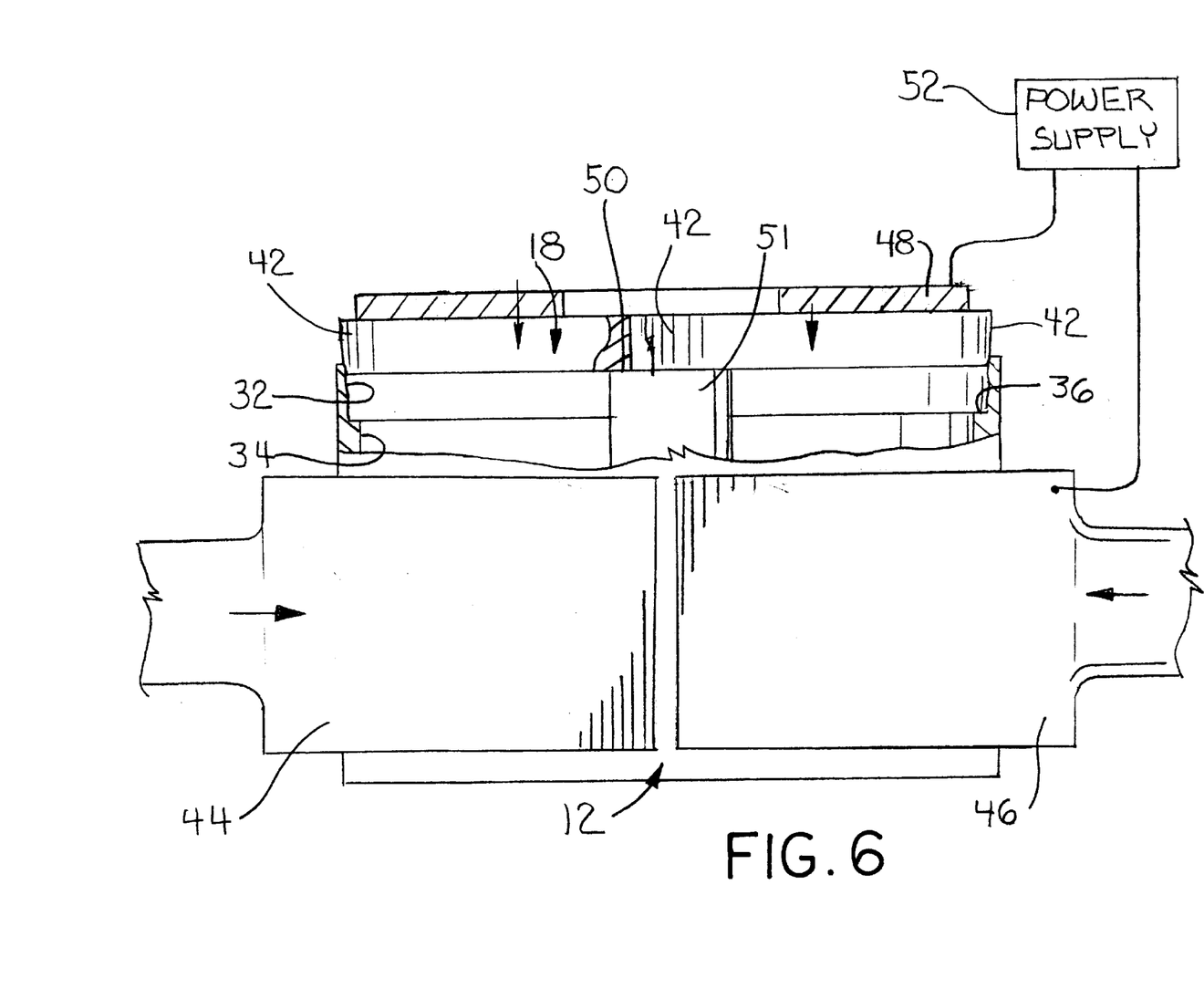

Referring now to FIGS. 4–6, when the piston plate 18 is to be secured to the ring 12, the ring 12 is clamped between two nearly semi-circular copper alloy electrodes 44,46 in an alternating current resistance welding machine, which are mounted on actuators (not shown) which cause the clamping members 44, 46 to move radially with respect to the ring 12. The semi-circular electrodes 44,46 are typically made from a fully circular copper alloy electrode which is then separted into two halves. The electrodes 44,46 are shorted together electrically and connected to a terminal of the weld machine power supply 52. Accordingly, when the piston 12 is assembled, the clamping members 44, 46 are operated to engage and hold the outer circumferential surface 28 of the piston ring or skirt 16, as shown in FIG. 5.

As also shown in FIGS. 4 and 5, the plate 18 is supported on a pin 51 which extends coaxially through the ring 12 in order to assure that the ring and plate remain concentric as the plate is secured to the ring. The pin includes a smaller diameter portion which extends into the aperture 38 in the plate 18 so that the plate 18 rests on the shoulder 50 defined between the larger and smaller diameter portions of the pin 51. The pin 51 is mounted such that it deflects in response to an axial force applied to the pin. An upper copper electrode 48 of a diameter substantially the same, but slightly smaller than, the outer diameter surface 40 of the plate 18 is brought into engagement with the plate 18. The electrode 48 is then urged downwardly viewing the Figures to apply a weld force on the plate 18, urging the portions 42 of the plate against the ring 12. The plate 18 is urged against the shoulder 36.

Figure 7:
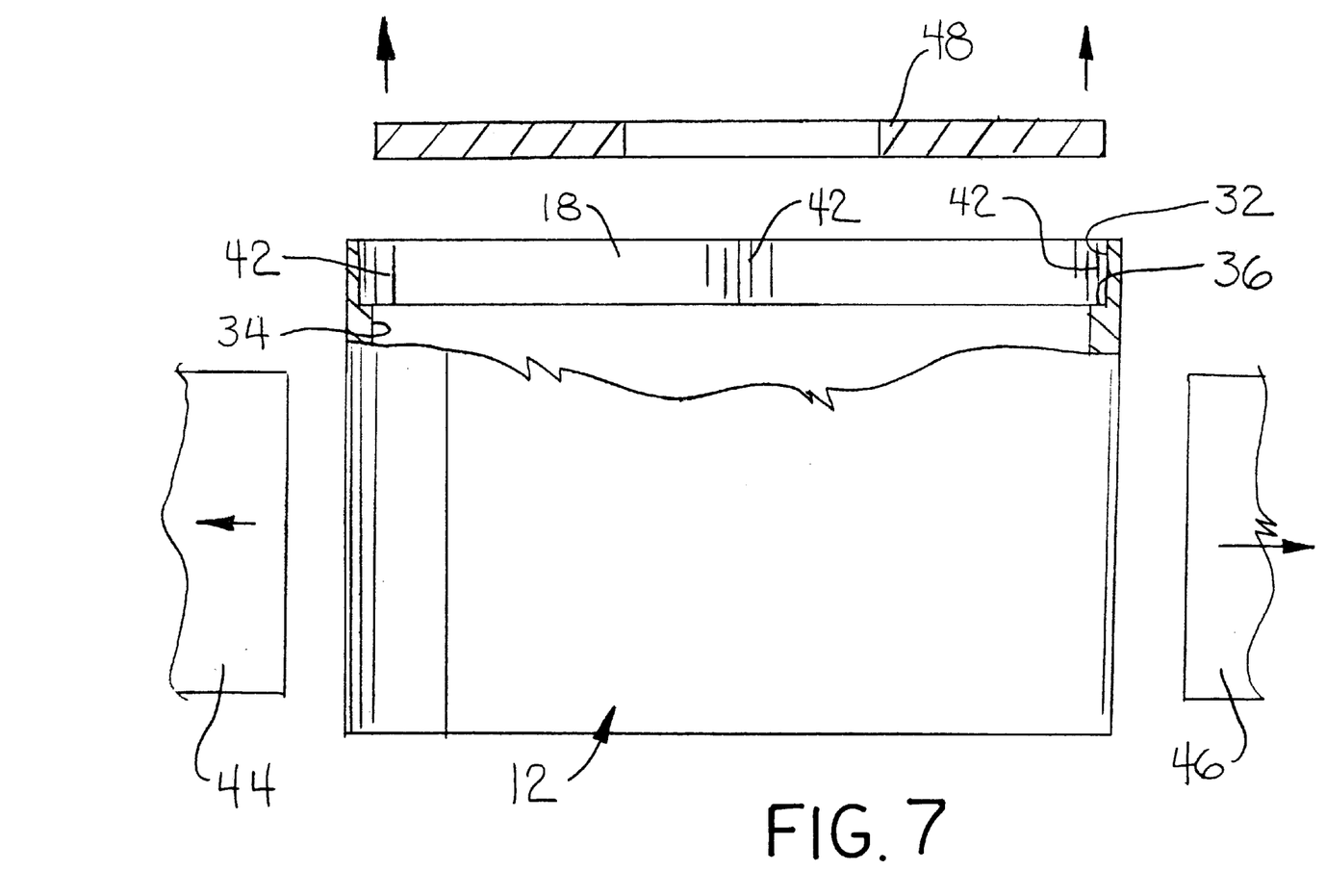

Due to interference of the projections 42 of the plate 18, the plate 18 does not enter the ring 12 with the application of the weld force alone (but instead engages the end face 54), as indicated by FIG. 5. When an appropriate weld current is applied for a short period typically not exceeding one second, the heat and pressure make the plate 18 move into the ring 12, without significant melting at the weld interface, as shown in FIG. 6. The portions 42 of the plate 18 and the portions of the skirt engaged by projections 42 become plastic and intermingle with one another, forming a solid state weld. The clamping electrodes 44,46 are then moved away to release the completed assembly, as shown in FIG. 7.

What is claimed is:

1. Method of manufacturing a piston for magneto-rheological fluid systems, comprising the steps of providing a piston ring made of a material having a relatively high magnetic permeability and a piston plate made of a material having a low magnetic permeability, said ring having an inner circumferential surface defining an inner diameter of said ring, said ring terminating in an end face, said plate having an interfering portion larger than the inner diameter of said ring whereby said interfering portion of the plate engages said end face when the plate is urged against said end face, forcing the plate against the end face of the ring while causing an electrical current to flow through the plate sufficient to heat the interfering portion of the plate engaging the end face to a temperature below the melting point of either material but sufficient to soften the interfering portion of the plate to permit the plate to be forced inside of the ring, forcing the plate into the ring, and removing said current.

2. Method of manufacturing as claimed in claim 1, wherein said plate includes outwardly projecting segments defining the interfering portion of the plate.

3. Method of manufacturing as claimed in claim 1, wherein said method includes the step of adjusting the magnitude of the current sufficient to heat the interfering portion of the plate and the portion of the ring engaged by said interfering portion of the plate to a temperature sufficient to cause the interfering portion of the plate and sections of the ring engaged by said interfering portions of the plate to become plastic.

4. Method of manufacturing as claimed in claim 1, wherein said method includes the step of adjusting the magnitude of the current to cause the interfering portion of the plate and the corresponding portion of the ring engaged by said interfering portion of the plate to a temperature causing both of said portions to become sufficiently plastic that a solid state bond is achieved between the plate and the ring.

5. Method of manufacturing as claimed in claim 4, wherein said method includes the steps of clamping the ring into a clamping electrode having sections engaging the outer circumferential surface of the ring, connecting said clamping electrode to one terminal of a power supply having a pair of terminals, supporting the plate over said end face, engaging said plate with an electrode connected to the other terminal of said power supply, and causing said electrodes to move toward one another while energizing said power supply.

6. Method of manufacturing as claimed in claim 5, wherein said inner circumferential surface of said piston is stepped to define larger and smaller diameter sections with a shoulder therebetween, said method including the steps of forcing said plate into the larger diameter segment until the plate engages said shoulder.

7. Method of manufacturing as claimed in claim 1, wherein said method includes the steps of clamping the ring into a clamping electrode having sections engaging the outer circumferential surface of the ring, connecting said clamping electrode to one terminal of a power supply having a pair of terminals, supporting the plate over said end face, engaging said plate with an electrode connected to the other terminal of said power supply, and causing said electrodes to move toward one another while energizing said power supply.

8. Method of manufacturing as claimed in claim 1, wherein said inner circumferential surface of said piston is stepped to define larger and smaller diameter sections with a shoulder therebetween, said method including the steps of forcing said plate into the larger diameter segment until the plate engages said shoulder.

9. Method of manufacturing a piston for magnetorhelogical fluid systems, comprising the steps of providing a piston ring made of a material having a relatively high magnetic permeability and a piston plate made of a material having a low magnetic permeability, said ring having an inner circumferential surface defining an inner diameter of said ring, said ring terminating in an end face, said plate having a portion engaging said piston ring when the plate is urged against said piston ring, axially aligning the plate with the ring, and forcing the ring against the plate while causing an electrical current to flow through the plate sufficient to heat the portion of the plate engaging the piston and the portion of the piston engaging said plate to a temperature below the melting point of either of said materials but sufficient to soften the portions of the plate and the piston ring engaging one another sufficiently to cause said portions of the plate and piston to become sufficiently plastic that said portions intermingle to form a solid state bond between the plate and the ring when cooled.

10. Method of manufacturing as claimed in claim 9, said method including the step of forcing the plate inside of the ring while applying said current.

11. Method of manufacturing as claimed in claim 9, wherein said method includes the steps of clamping the ring into a clamping electrode having sections engaging the outer circumferential surface of the ring, connecting said clamping electrode to one terminal of a power supply having a pair of terminals, engaging the plate with an electrode connected to the other terminal of said power supply, and causing said electrodes to move toward one another while energizing said power supply.

12. Method of manufacturing as claimed in claim 11, wherein said inner circumferential surface of said piston is stepped to define larger and smaller diameter sections with a shoulder therebetween, said method including the steps of forcing said plate into the larger diameter segment until the plate engages said shoulder.

13. Method of manufacturing as claimed in claim 9, wherein said inner circumferential surface of said piston is stepped to define larger and smaller diameter sections with a shoulder therebetween, said method including the steps of forcing said plate into the larger diameter segment until the plate engages said shoulder.

\* \* \* \* \*